(12) United States Patent
Engel

(10) Patent No.: US 9,326,448 B2
(45) Date of Patent: May 3, 2016

(54) ROLLER SHELL FOR A CONDITIONING ROLLER

(71) Applicant: Deere & Company, Moline, IL (US)

(72) Inventor: Manfred Engel, Grosssteinhausen (DE)

(73) Assignee: DEERE & COMPANY, Moline, IL (US)

( * ) Notice: Subject to any disclaimer, the term of this patent is extended or adjusted under 35 U.S.C. 154(b) by 289 days.

(21) Appl. No.: 13/650,454

(22) Filed: Oct. 12, 2012

(65) Prior Publication Data

US 2013/0092774 A1    Apr. 18, 2013

(30) Foreign Application Priority Data

Oct. 13, 2011   (DE) .................. 10 2011 084 443

(51) Int. Cl.
*B02C 4/30* (2006.01)
*A01D 82/02* (2006.01)
*A01D 43/10* (2006.01)

(52) U.S. Cl.
CPC ............... *A01D 82/02* (2013.01); *A01D 43/10* (2013.01); *B02C 4/30* (2013.01)

(58) Field of Classification Search
CPC .............. B02C 4/00; B02C 4/06; B02C 4/08; B02C 4/30; B02C 18/142; A01D 82/02; A01D 43/10
USPC ........... 241/236, 294, 293; 492/28, 30, 31, 36
See application file for complete search history.

(56) References Cited

FOREIGN PATENT DOCUMENTS

| DE | 4327592 A1 | 2/1995 |
| DE | 19703486 A1 | 8/1998 |
| DE | 10343253 A1 | 5/2005 |
| DE | 102007038092 A1 | 2/2009 |
| FR | 2631776 A1 | 12/1989 |
| GB | 402202 | * 11/1933 |

\* cited by examiner

*Primary Examiner* — Mark Rosenbaum

(57) ABSTRACT

A roller shell for a conditioning roller has grooves extending in the axial direction and grooves extending in the circumferential direction. The grooves extending in the axial direction are deeper than the grooves extending in the circumferential direction.

9 Claims, 3 Drawing Sheets

ROLLER SHELL FOR A CONDITIONING ROLLER

FIELD OF THE DISCLOSURE

The disclosure relates to a roller shell for a conditioning roller, in which grooves extending in the axial direction and grooves extending in the circumferential direction are introduced.

BACKGROUND OF THE DISCLOSURE

Forage harvesters are used for the harvesting of whole plants or their parts, which are gathered from a field during operation by means of a harvesting attachment, are compressed by pre-pressing rollers, and are conducted to a chopping drum, whose chopping blades cut the plants in interaction with a counter-blade. Subsequently, the cut plants or parts are optionally conducted to a conditioning device and are conveyed by means of a post-acceleration device into a discharge spout which transfers them to a transporting vehicle. Generally, the harvested plants are used as cattle feed or for the production of biogas. The conditioning device usually comprises two or more rollers driven in opposite directions, which are pre-tensioned against one another by an elastic force, and between which, the chopped material is conducted. It is used in the harvesting of corn, so as to beat the grains contained in the chopped material and to improve the digestibility of the feed.

A known embodiment of a conditioning device is described in DE 197 03 486 A1, according to which the rollers are composed of alternating sections of smaller and larger diameter, which follow one another in the axial direction and have teeth in their circumference. Smaller sections of a first roller are placed opposite the larger sections of the second rollers, interacting with the first roller, and vice-versa, so that the larger sections of the second roller are introduced between the larger sections of the first roller. The sections are designed as rings and are mounted in a form-locking manner on a carrier roller. Corn grains are broken up by the teeth on the circumference of the sections and husks are comminuted on the radial edges of the sections. With another embodiment, a roller with cutting disks is provided, and these are inserted between toothed, cylindrical sections and penetrate into the slots or grooves of the other roller, which are deeper than the teeth of the toothed sections. Here, the production and putting together of the sections prove to be cumbersome and cost-intensive.

DE 103 43 253 A1 describes another conditioning device, in which a roller shell of the conditioning roller is equipped with different slopes, which have the same depth in a first embodiment and are conducted around the roller shell in opposite directions in the form of a helix. In a second embodiment, first grooves extend, in the circumferential direction around the toiler and second grooves in the axial direction, wherein the formed sawtooth-shaped profile blocks of one roller are aligned axially with complementary profile grooves of the other roller. In the second embodiment, which is easier to produce with regard to manufacturing technology than the first embodiment and by the immersion of the profile blocks of one roller into the profile grooves of the other roller first makes possible the maceration of the corn grains, the wreaths of sharp teeth, which are successive in the axial direction on the surface of the roller, are formed. Between these wreaths (that is, in the first grooves, introduced in the circumferential direction), the roller shell, however, is completely smooth so that a processing of the crop cannot take place there. For this reason, the effect of this conditioning device is not always sufficient.

Similar roller shells with grooves in the axial direction and the circumferential direction are described in DE 10 2007 033 092 A1. Here, too, the bottoms of the circumferential grooves are smooth and do not help in the processing of the crop. FR 2 831 776 A1 shows a roller shell with an undulating profile, whose wave crests have teeth in the circumferential direction. The wave troughs are, in fact, smooth.

Finally, DE 43 27 592 A1 shows an arrangement with two rollers for the processing of crops, in which profile blocks of one roller mesh in circumferential grooves of the other roller.

SUMMARY OF THE DISCLOSURE

The problem on which the disclosure is based is to be found in making available a roller shell for a conditioning roller, which is improved in comparison to the described state of the art.

A roller shell for a conditioning roller comprises grooves extending in the circumferential direction and groves extending in the axial direction, which are deeper than the grooves extending in the circumferential direction. In this way, one accomplishes that material remains in the profile bottoms of the grooves extending in the circumferential direction, which forms, with the deeper grooves extending in the axial direction, which move forward and trail behind in the circumferential direction, edges projecting outwards and thus (with regard to the axial direction) between the profile blocks, which remain between two axial grooves and two grooves extending in the circumferential direction, also makes possible a comminution of the crop. Thus, the comminution of the crop is improved.

In one embodiment, adjacent grooves extending in the circumferential direction are at a distance from one another to such an extent that profile blocks with ridges extending axially remain between them. The grooves extending in the circumferential direction form profile bottoms that extend axially. In other words, the profile blocks and the profile bottoms remaining in between look crenellated, wherein the side edges of the crenellations can extend radially or form an inclined gradient angle of, for example, 45°.

The cross-section of the grooves extending in the axial direction is preferably V-shaped.

To produce a conditioning device, at least two roller shells are needed, each of which complete a conditioning roller and can be driven in a rotating manner. The crops are conducted between the conditioning rollers, wherein the grooves of one roller extending in the circumferential direction are arranged in the axial direction between the grooves of the other roller extending in the circumferential direction, and the profile blocks of the roller shell of one roller remaining between the grooves extending in the circumferential direction are immersed in the grooves of the other roller extending in the circumferential direction.

BRIEF DESCRIPTION OF THE DRAWINGS

An embodiment of the disclosure is described in more detail below with reference to the accompanying drawings wherein.

DETAILED DESCRIPTION OF THE DRAWINGS

Figure 1:
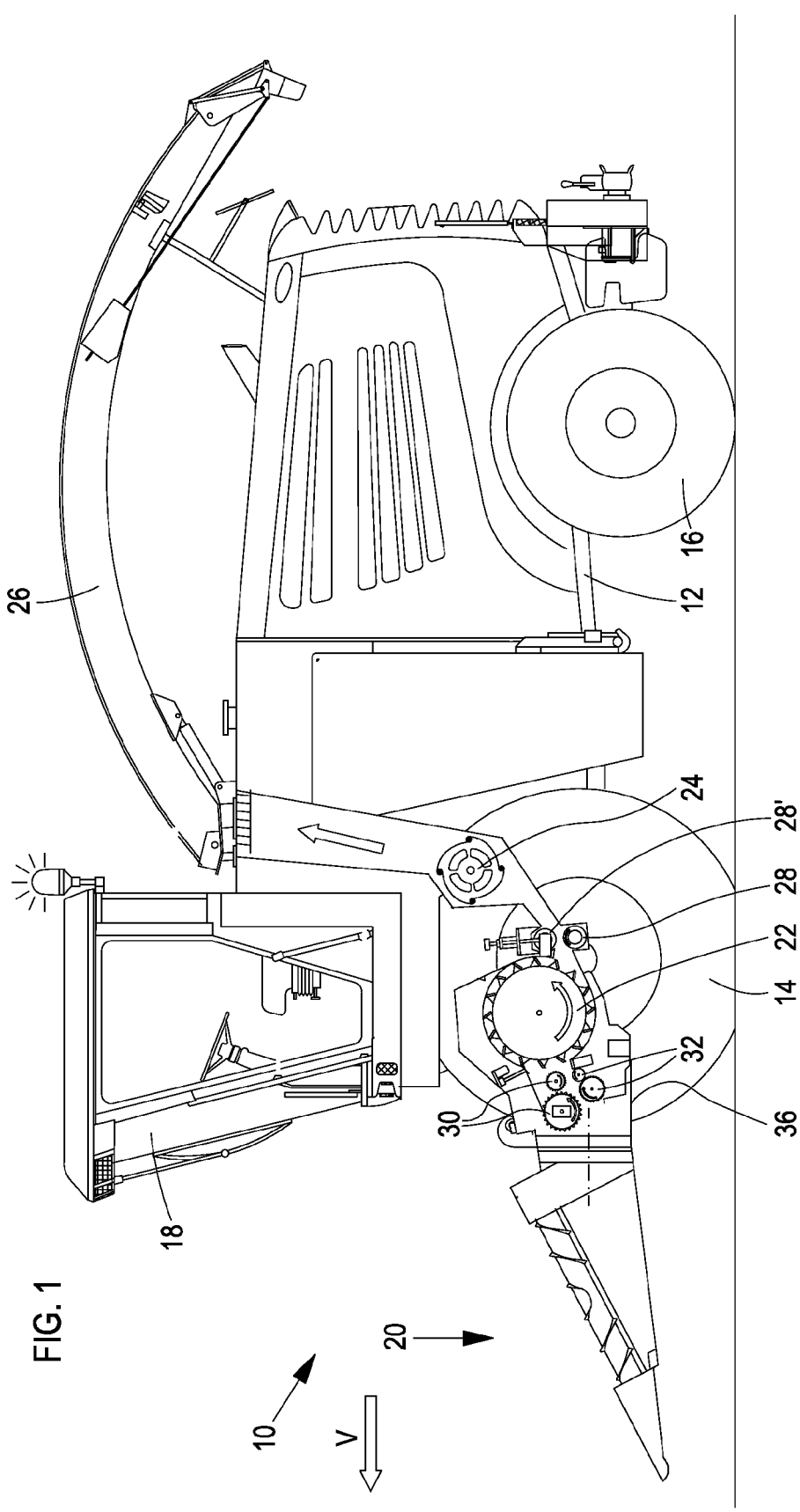
FIG. 1 is a forage harvester with conditioning rollers in accordance with the disclosure in a side view and in schematic representation.

A harvesting machine 10, shown in FIG. 1, in the form of a self-propelled forage harvester, is made up of a frame 12, which is supported by driven front wheels 14 and steerable rear wheels 16. The operation of the harvesting machine 10 is carried out from a drivers cabin 18, from which a harvesting attachment 20 suitable for the harvesting of stem-like plants can be seen. By means of the harvesting attachment 20, which in the depicted embodiment is a corn header working independently of the row, material gathered from the ground, for example, corn, cereal, or the like, is conducted through upper pre-pressing rollers 30 and lower pre-pressing rollers 32 to the chopper drum 22, which chops it into small pieces and delivers it to a conveying device 24. The material exits the harvesting machine 10 to a nearby moving trailer via a discharge device 26, which can be adjusted in its position. Between the chopper drum 22 and the conveying device 24, there extends a conditioning device with two conditioning rollers 28, 28', through which the material to be conveyed is supplied to the conveying device 24 tangentially. In the following, direction indications, such as front, rear, left, and right, refer to—unless otherwise mentioned—the forward direction V of the harvesting machine 10, which runs from right to left in FIG. 1.

Between the crop gathering device 20 and the chopper drum 22, the material is transported through a gathering conveyor with lower conveying rollers 32 and upper conveying rollers 30, which are placed within a gathering housing 36. The conveying rollers 30, 32 are also designated as prepressing rollers, since the upper conveying rollers 30 are pre-tensioned, by elastic force against the lower conveying rollers 32, so that the crop is pre-compressed between the conveying rollers 30, 32 and can be cut better. The chopping blades distributed around the circumference of the chopper drum 22 work together with counter-cutters, so as to chop the material.

Figure 2:
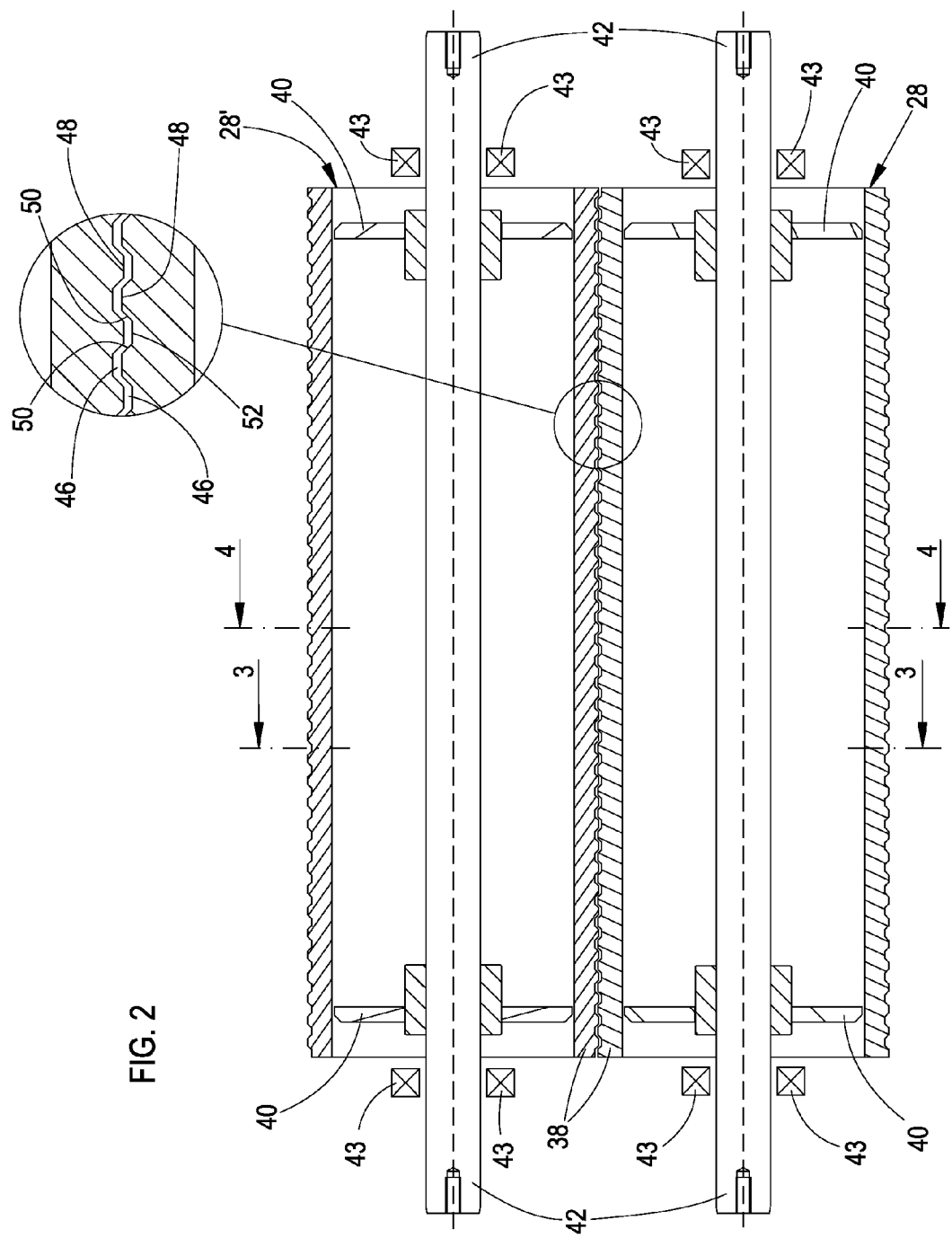
FIG. 2 is a vertical cross-section transverse to the forward direction through the conditioning rollers of FIG. 1 along line 2-2.
Figure 4:
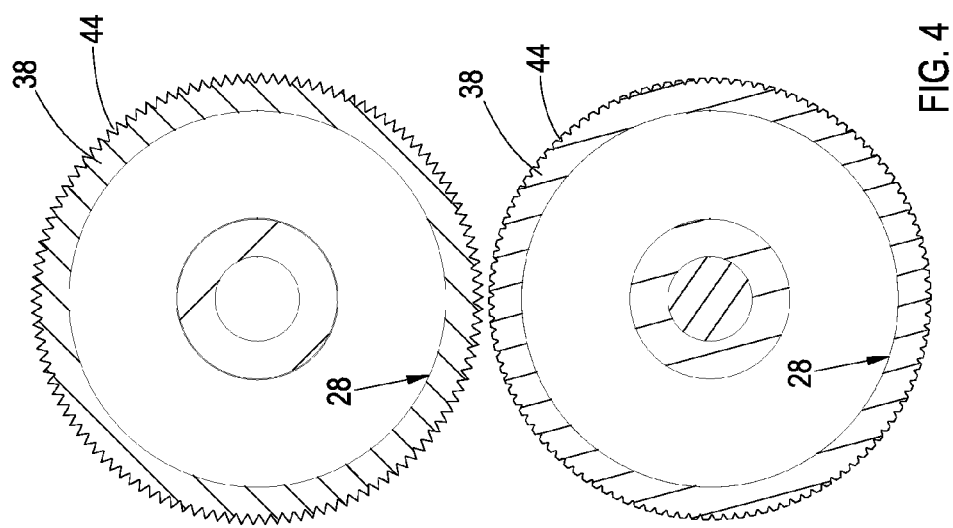
Figure 3:
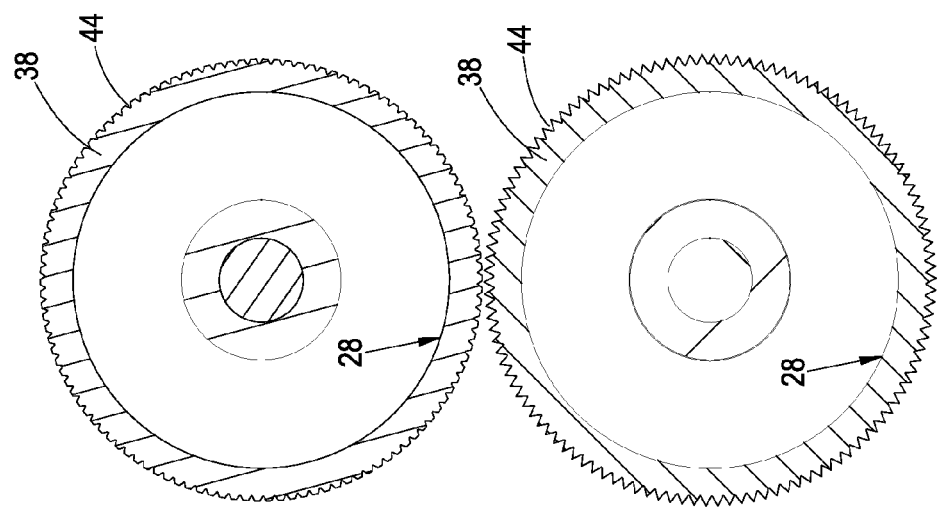
FIG. 3 is a cross-section through a conditioning roller of FIG. 2 along line 3-3; and, FIG. 4 is a cross-section through a conditioning roller of FIG. 2 along line 4-4.

FIG. 2 shows a vertical cross-section transverse to the forward direction through the conditioning rollers 28, 28' of FIG. 1 along line 2-2. The conditioning rollers 28, 28' comprise a roller shell 38, which is supported by a supporting disk 40, axle stub 42, and supports 43, so it can rotate on the frame 12 and can be made to rotate in the harvesting operation by means of a suitable drive (not depicted), around its middle axis, wherein the two conditioning rollers 28, 28' can be driven at circumferential speeds that are different relative to one another, and are pre-tensioned against one another by means of an elastic force (and/or the hydraulic cylinder). The roller shells 30 of the two conditioning rollers 28 are provided with axial grooves 44 (see FIGS. 3 and 4) and grooves 46, which extend in the circumferential direction (FIG. 2).

The grooves 46, which extend in the circumferential direction, have a V-shaped cross-section, and accordingly have side flanks, which extend at an incline outward.

The grooves 46, which extend in the circumferential direction, are not as deep as the grooves 44, which extend in the axial direction. Furthermore, the grooves 46, which extend in the circumferential direction, are arranged at axial intervals from one another, so that profile blocks 48 with outer ridges extending axially remain between them. Also, the side flanks 50 of the grooves 46, which extend in the circumferential direction, are sufficiently at a distance from one another, so that profile bottoms 52 extending axially form between them. As one can see in FIG. 2, the profile blocks 48 and the profile bottoms 52 remaining in between are crenellated. The flanks 50 are shaped rising outward at an incline, although they could also be oriented flatter or steeper or even radially. Preferably, all gradient angles of the flanks 50 of all grooves 44 and 46 are identical.

The roller shells 38 of the two conditioning rollers 28, 28' are arranged in such a way that the grooves 46 extending in the circumferential direction of one conditioning roller 28 are arranged in the axial direction between the grooves 46 extending in the circumferential direction of the other conditioning roller 28', and the profile blocks 48 of the roller shell 38 for one conditioning roller 28 remaining in grooves 46 extending in the circumferential direction are immersed in grooves 46 extending in the circumferential direction of the other conditioning roller 28'. The intervals between the profile bottoms 52 of one conditioning roller 28 and the adjacent profile blocks 48 of the other conditioning roller 28' and vice-versa and between the adjacent flanks 50 of the two conditioning rollers 28, 28' are generally somewhat smaller than the diameter of the grains of the crop to be macerated.

The profile blocks 48 accordingly form hipped roof-shaped teeth with outer ridges, which extend flat in the axial direction and decline inward at an incline both in the circumferential direction (through the flanks of the grooves 44 extending axially) and also on the side flanks 50 (through the grooves 46 extending in the circumferential direction). As one can see with the aid of FIGS. 2 and 4, the profile bottoms 52 located in the axial direction between the profile blocks 48 also form edges, which are lower in comparison to the profile blocks 48 and decline in the circumferential direction to the bottoms of the advancing and trailing grooves 44 extending axially, and contribute to the comminution of the grains.

Having described the preferred embodiment, it will become apparent that various modifications can be made without departing from the scope of the disclosure as defined in the accompanying claims.

The invention claimed is:

1. A roller shell for a conditioning roller, the roller shell having grooves extending in the axial direction and grooves extending in the circumferential direction, wherein the grooves extending in the axial direction are deeper than the grooves extending in the circumferential direction, wherein adjacent grooves extending in the circumferential direction are at a sufficient distance from one another so that profile blocks with ridges extending axially remain between the adjacent grooves extending in the circumferential direction, and wherein the width of the profile blocks is less than or equal to the width of the grooves extending in the circumferential direction.

2. The roller shell of claim 1, wherein the grooves extending in the circumferential direction form profile bottoms extending axially.

3. The roller shell of claim 1, wherein the flanks of the grooves extending in the circumferential direction form an inclined gradient angle.

4. The roller shell of claim 1, wherein the grooves extending in the axial direction have a V-shaped cross-section.

5. A pair of conditioning rollers for a forage harvester comprising:

a first conditioning roller having grooves extending in the axial direction and grooves extending in the circumferential direction, wherein the grooves extending in the axial direction are deeper than the grooves extending in the circumferential direction, and wherein adjacent grooves extending in the circumferential direction are at a sufficient distance from one another so that profile blocks with ridges extending axially remain between the adjacent grooves extending in the circumferential direction;
a second conditioning roller having grooves extending in the axial direction and grooves extending in the circumferential direction, wherein the grooves extending in the axial direction are deeper than the grooves extending in the circumferential direction, and wherein adjacent grooves extending in the circumferential direction are at a sufficient distance from one another so that profile blocks with ridges extending axially remain between the adjacent grooves extending in the circumferential direction;
wherein the grooves extending in the circumferential direction of the first conditioning roller are arranged in the axial direction and positioned between the grooves extending in the circumferential direction of the second conditioning roller, and wherein profile blocks of the first conditioning roller are immersed into the grooves extending in the circumferential direction of the second conditioning roller.

6. A conditioning roller for a forage harvester comprising:
a roller shell having grooves extending in the axial direction and grooves extending in the circumferential direction, wherein the grooves extending in the axial direction are deeper than the grooves extending in the circumferential direction, wherein adjacent grooves extending in the circumferential direction are at a sufficient distance from one another so that profile blocks with ridges extending axially remain between the adjacent grooves extending in the circumferential direction, and wherein the width of the profile blocks is less than or equal to the width of the grooves extending in the circumferential direction.

7. The conditioning roller of claim 6, wherein the grooves extending in the circumferential direction form profile bottoms extending axially.

8. The conditioning roller of claim 6, wherein the flanks of the grooves extending in the circumferential direction form an inclined gradient angle.

9. The conditioning roller of claim 6, wherein the grooves extending in the axial direction have a V-shaped cross-section.

* * * * *